Figure 1:
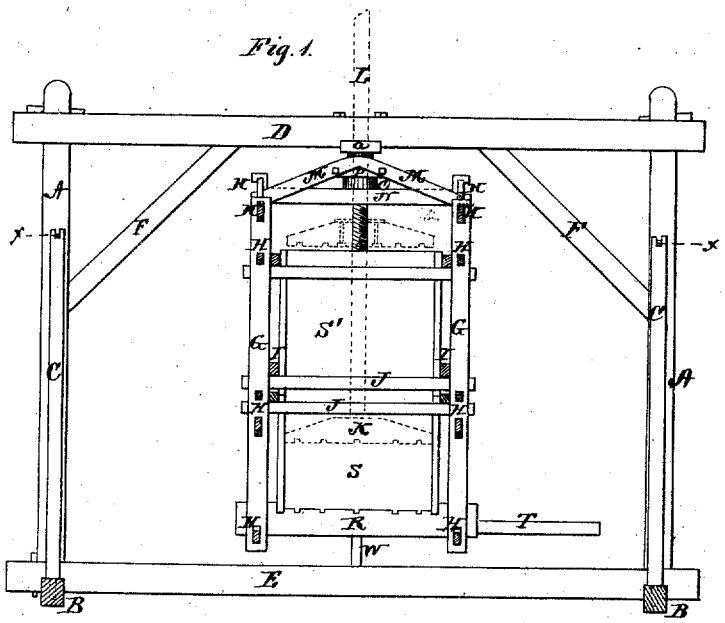
Figure 2:
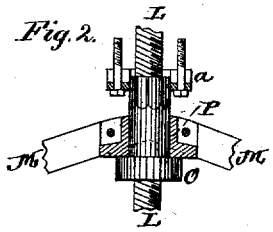

R. M. BROOKS.

Improvement in Portable Revolving Screw-Presses.

No. 4,997. Reissued July 23, 1872.

Witnesses:

Henry N. Miller

C. L. Evert.

Inventor.

Rhodom M. Brooks per Alexander Mason

Attorneys.

AM. PHOTO-LITHOGRAPHIC CO. N.Y. (OSBORNE'S PROCESS)

UNITED STATES PATENT OFFICE.

RHODOM M. BROOKS, OF PIKE COUNTY, GEORGIA, ASSIGNOR TO W. T. TRAMMELL.

IMPROVEMENT IN PORTABLE REVOLVING SCREW-PRESSES.

Specification forming part of Letters Patent No. 59,352, dated November 6, 1866; reissue No. 4,997, dated July 23, 1872.

*To all whom it may concern:*

Be it known that I, RHODOM M. BROOKS, of the county of Pike and in the State of Georgia, have invented certain new and useful Improvements in "Screw-Presses;" and do hereby declare that the following is a full, clear, and exact description thereof, reference being had to the accompanying drawing and to the letters of reference marked thereon.

In the annexed drawing, making part of this specification, A A represent two uprights, which are mortised into two sills, B B, at their bottoms, and also into a cross-piece, E, which runs across from one sill to the other. C C are braces, which stand upon each side of the uprights A A, being mortised at their lower ends into the sills B B. The upper ends of these braces are mitered or beveled to rest against the uprights, and are slotted, as shown, in order that a pin, as seen at *x x*, may be driven through the uprights, and also into the slots in their ends, to confine them in position. The two upper ends of the uprights A A are provided with mortises, into which pass tenons upon the ends of the cross-bar D. F F are two braces, which rest between the uprights A and the cross-tie D. The several pieces framed together as thus described form the frame which supports the press-box, constructed as follows:

The frame of the press-box consists of four upright metallic bars, G, (two at each end,) with metallic cross-bars H H at the ends connecting said uprights together; also of two metallic cross-bars or ties M at the top, and a bed or bottom, R. Within this frame the press-box is secured. S S′ represent the upper and lower sections of the sides of the box, which sides are of course provided with suitable and corresponding end pieces. These sides and ends of the box are confined in position within the metallic frame by means of the wooden cross-ties or bars J J and I I. L represents a screw-rod, made either of metal or of wood, (but I prefer metal,) which has secured to its lower end a follower, K. This follower is made so as to fit snugly in the press-box. N represents a wooden cross-piece at the top of the metallic frame. Through this cross-piece the screw-rod L passes and then passes into a nut, O. This nut, which is made of metal, is secured at its upper end to a plate, *a*, which said plate is permanently secured to the cross-piece D by means of screws or bolts. P represents a metallic collar, through which the nut O passes. This collar catches under the metallic cross-ties M M, which are bolted together at a suitable distance apart on each side of the nut, to keep them from spreading when pressure is put on them. The screw-rod L passes through the bar D, as shown. W represents a pivot at the center of the bed or bottom R, which said pivot rests in a suitable socket in the lower cross-tie E of the outer frame. This press-box is intended to revolve, while pressing cotton, &c., upon the screw-rod L as a pivot at its upper end and the pivot W at its lower end. T represents a lever secured by proper staples to the press-box near its lower end, to which power is attached for revolving said box.

In using this press the cotton, &c., is first placed in the press-box; then the follower K is inserted in the top of the box, and power being applied to the lever T the box is made to revolve around and around, and as it revolves the nut O, which is held stationary, forces the screw-rod with its follower K down, thus pressing the cotton into a bale in the lower section of the press-box. The sides of this lower section of the box are intended to form doors hung on hinges, so as to be raised up and the bale removed after being pressed.

This press may be used for pressing hay, cotton, wool, or any other material, and can readily be taken to pieces, if desired, and removed to any portion of the field where needed.

Having thus fully described my invention, what I claim as new, and desire to secure by Letters Patent, is—

1. The combination of a revolving press-box with follower and screw-rod and a stationary nut, or their mechanical equivalents, substantially as herein set forth.

2. A press-box confined within a revolving frame composed of metallic bars G H, metallic cross-ties M M, and a bed or bottom, R, or their mechanical equivalents, substantially as herein set forth.

3. The collar P surrounding the stationary nut O and placed between the metallic cross-ties M M, or their mechanical equivalents, substantially as and for the purposes herein set forth.

In testimony that I claim the foregoing I have hereunto set my hand and seal this 3d day of June, 1872.

RHODOM M. BROOKS. [L. S.]

Witnesses:

S. W. MANGHAM,

A. N. MARR.